(No Model.) 2 Sheets—Sheet 1.

W. EVANS.
DIE FOR MAKING HATCHETS.

No. 258,568. Patented May 30, 1882.

Witnesses;
S. Walter Fowler,
T. A. A. Durand

Inventor;
Wm. Evans,
by Hughmun & Kane,
Attorneys.

(No Model.) 2 Sheets—Sheet 2.

W. EVANS.
DIE FOR MAKING HATCHETS.

No. 258,568. Patented May 30, 1882.

Witnesses;
S. Walter Fowler,
T. A. A. Durand.

Inventor;
Wm. Evans,
by
Hylmun & Kane,
Attorneys.

UNITED STATES PATENT OFFICE.

WILLIAM EVANS, OF CHESTER, PENNSYLVANIA.

DIE FOR MAKING HATCHETS.

SPECIFICATION forming part of Letters Patent No. 258,568, dated May 30, 1882.

Application filed June 20, 1881. (No model.)

*To all whom it may concern:*

Be it known that I, WILLIAM EVANS, a citizen of the United States of America, residing at Chester, in the county of Delaware and State of Pennsylvania, have invented certain new and useful Improvements in Dies for Manufacturing Hatchets and Like Articles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the manufacture of hatchets; and the novelty consists in the construction of the respective dies, as will be hereinafter more fully described, and pointed out in the claims.

My improvement further consists in the novel construction of the series of dies for manufacturing hatchets, as will be hereinafter more fully described and specifically claimed.

In the accompanying drawings the various figures show means for carrying out my invention.

Figure 1:
Figure 2:
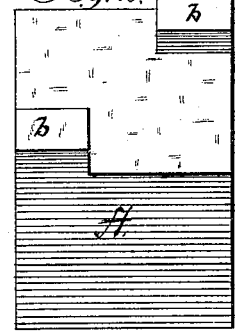
Figure 3:
Figure 4:
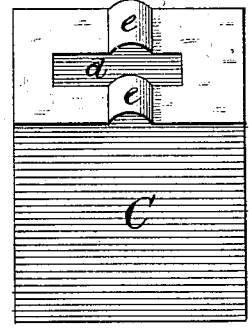
Figure 5:
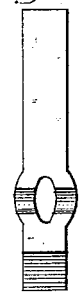
Figure 6:
Figure 7:
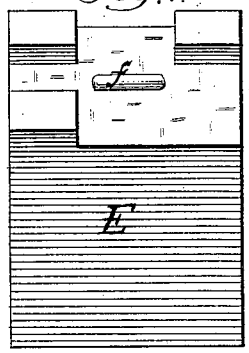
Figure 8:
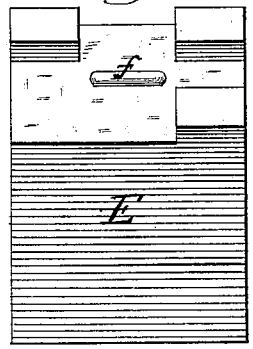
Figure 9:
Figure 10:
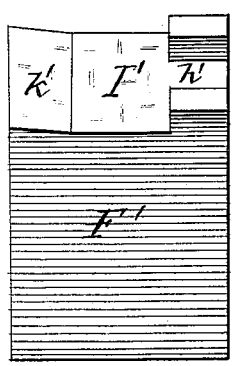
Figure 11:
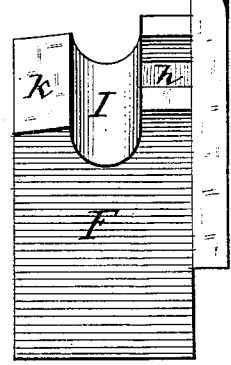
Figure 12:
Figure 16:
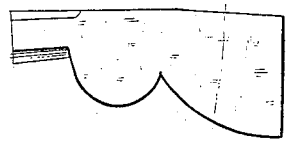
Figure 13:
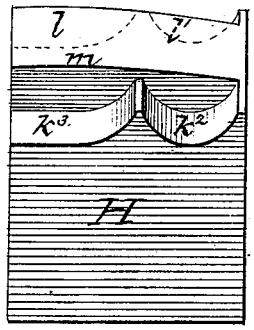
Figure 15:
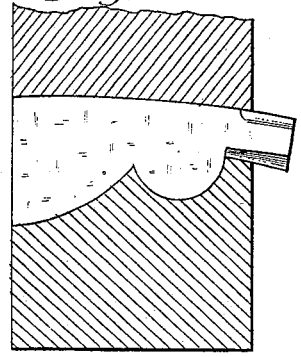
Figure 18:
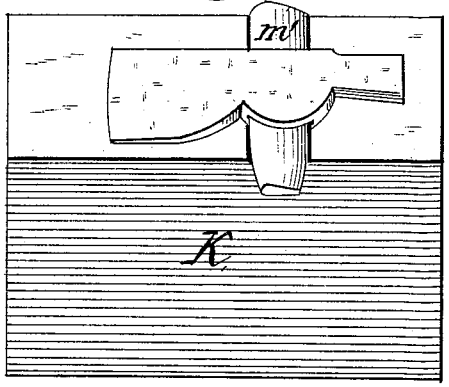
Figure 19:
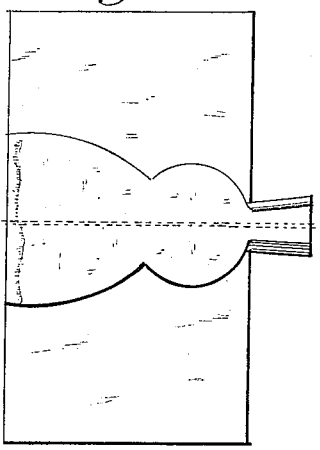

In order that my method or process of manufacturing hatchets may be fully understood, I will describe its various progressive steps, which are as follows: From a bar of metal of the proper size I cut a rectangular piece, (see Figure 1,) which is called a "blank" or "stock," of about the weight of the hatchet to be made. This blank or stock is heated to the required degree—"white heat"— and to one end of it is welded by welding machinery a piece of steel to constitute the poll or head of the hatchet. The blank in its working-heat is now placed edgewise upon the die A under a punch, B, of a suitable construction, (see Fig. 3,) which passes nearly through the blank, thus forming an eye or socket without removing any material. This die (see Fig. 2) is provided with two diagonally-arranged projections, $b$, extending above the plain die-surface to prevent lateral displacement of the blank during the punching or forming of the socket for the eye. The blank is then taken to the second die, C, (see Fig. 4,) formed with a slot, $d$, and ridges $e$, arranged on opposite sides of the slot, and that portion of the blank with the partially-formed socket is placed over the slot and ridges, and a second punch-pin, D, (see Fig. 6,) inserted in the hole or socket so made and driven far enough down to make a hole completely through the blank (the slot in the die being provided to permit it) without removing any metal. The blank as it comes from this second die of the series, after being subject to pressure, has the appearance as shown in Fig. 5. The blank is now turned over sidewise and placed between the pair of dies E. (Represented in Figs. 7 and 8. These dies are constructed in pairs, right and left, and have a central bulge, $f$, for "fullering" the metal at the eye portion, the appearance of which is seen in Fig. 9 of the drawings. The object of fullering is to spread the metal for forming the socket or eye of the hatchet and re-enforce or compress the metal around the eye, thereby gaining strength. The blank is next taken to the pair of dies F F', (see Figs. 10 and 11,) the lower one of which is formed with the depression $h$ for the poll or head of the hatchet, the transverse curved depression I for the eye-socket and the inclined surface $k$ for the blade or bit portion, and the upper one is formed with a corresponding depresssion, $h'$, for the poll or head, and the straight and inclined surfaces I' and $k'$ for "setting down" the metal on the upper portion of the eye-socket and for inclining the bit portion. Fig. 12 shows the appearance of the blank after the operation of these fourth dies at this stage of the process. The shaped blank for a "half" hatchet (see Fig. 12) is next taken to a pair of dies, H H', and placed between the same, as shown in Fig. 15, which, under the power of the press, gives the improved shape, as shown in Fig. 16 of the drawings. The die H is constructed with double-curved depressions $k^2 k^3 l l'$, arranged on opposite sides of the partition $m$, as seen in Fig. 13, while the die H' is constructed with the curved depressions $k^4 k^5$ on one side only for the "full" hatchet. The matching of these dies for the formation of the socket and blade or bit of the half and full hatchets is seen in Figs. 15 and 19. The blade or bit portion of the now shaped half-hatchet is heated (second time) to a welding-heat and split to receive the heated welding steel bit, which parts are placed together in the lower divided finishing-die, K, with a steady-pin, $m'$, in the eye, (see Fig. 18,)

and the upper die arranged thereon, when they are subjected to a powerful pressure by a drop-hammer to make the weld and form the hatchet. The now shaped hatchet is removed from the finishing-dies, nail-notch formed, tempered, and polished, by an emery-wheel or other finishing means, for the market.

Figure 20:
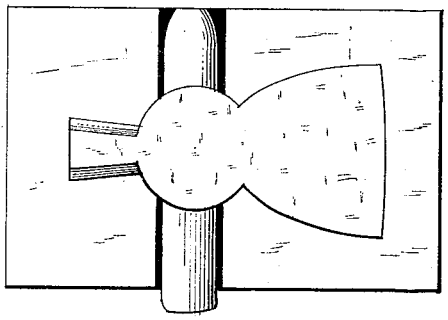
Figure 21:
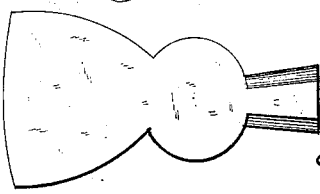

The dies for manufacturing "full" hatchets are doubled, as seen in Figs. 13 and 20. Heretofore it has required about six (6) heats to manufacture a hatchet, whereas by my improved method or process only two heats of the metal are required, owing to the arrangement of the dies for the progressive steps in the press or trip-hammers. This method of manufacturing hatchets by the series of dies re-enforces the metal at the eye-socket to secure strength at this weak point, improves the quality of the hatchet, and materially reduces the cost.

In practice the dies and punches used will be mounted in one press or power-hammer; or, if desired, the dies for welding the bit to the blade and finally shaping the hatchet may be placed upon a second press or power-hammer.

It is obvious that slight changes may be made without departing from the spirit of the invention.

The same progression in the method described may be carried out in the manufacture of a hatchet from a steel blank, except the welding of a bit and the second heat; also, by a slight change of the dies like articles to hatchets may be manufactured.

What I claim as my invention, and desire to secure by Letters Patent, is—

1. The die C, formed with the slot and ridges arranged on opposite sides of the slot, substantially as shown and described.

2. The pair of dies E E for fullering the metal, substantially as shown and described.

3. The pair of dies F F′, the die F′ being formed with an inclined surface, K′, horizontal surface I′, and depression h′, and the other die, F, being formed with the incline surface k, concave surface I, depression h, for the purpose of setting down the metal on the upper portion of the eye-socket and inclosing the bit portion, substantially as set forth.

Figure 14:
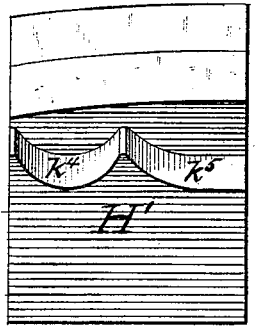

4. The pair of dies H H′ of the construction substantially as seen in Figs. 13 and 14, for the purpose stated.

Figure 17:
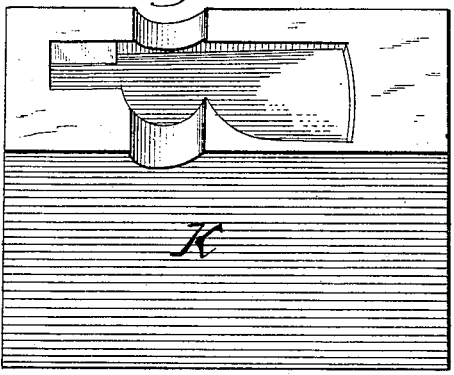

5. The pair of dies K K of the construction substantially as seen in Figs. 17 and 18, for the purpose stated.

6. The series of dies hereinbefore described for manufacturing hatchets in progressive steps.

In testimony whereof I affix my signature in presence of two witnesses.

WILLIAM EVANS.

Witnesses:
   J. WALTER LINDSAY,
   GEO. B. LINDSAY.